US012048953B1

(12) United States Patent
He et al.

(10) Patent No.: US 12,048,953 B1
(45) Date of Patent: Jul. 30, 2024

(54) DEVICE AND METHOD FOR CLEANING BOARD ERASERS

(71) Applicant: Shijiazhuang KeDa Educational Equipment Co., LTD., Shijiazhuang (CN)

(72) Inventors: Yuliang He, Shijiazhuang (CN); Mingtao Li, Shijiazhuang (CN); Zikuan Li, Shijiazhuang (CN)

(73) Assignee: Shijiazhuang Keda Educational Equipment Co., Ltd., Shijiazhuang (CN)

( * ) Notice: Subject to any disclaimer, the term of this patent is extended or adjusted under 35 U.S.C. 154(b) by 0 days.

(21) Appl. No.: 18/619,070

(22) Filed: Mar. 27, 2024

Related U.S. Application Data

(63) Continuation of application No. PCT/CN2022/114559, filed on Aug. 24, 2022.

(30) Foreign Application Priority Data

Sep. 30, 2021 (CN) .......................... 202111160749.9
Sep. 30, 2021 (CN) .......................... 202111164340.4

(51) Int. Cl.
*B08B 3/14* (2006.01)
*B08B 3/02* (2006.01)

(52) U.S. Cl.
CPC . *B08B 3/14* (2013.01); *B08B 3/02* (2013.01)

(58) Field of Classification Search
CPC .................................... B08B 3/14; B08B 3/02
See application file for complete search history.

(56) References Cited

U.S. PATENT DOCUMENTS 628,615 A * 7/1899 Smith .................. A47L 13/502 15/89
667,540 A * 2/1901 Little ........................ B08B 5/02 15/91

(Continued)

FOREIGN PATENT DOCUMENTS

CN 2889526 Y 4/2007
CN 201353568 Y 12/2009

(Continued)

OTHER PUBLICATIONS

Certified Copy of Priority Document CN 202111160749.9 (Year: 2021).*

(Continued)

*Primary Examiner* — Benjamin L Osterhout
(74) *Attorney, Agent, or Firm* — AP3 Law Firm PLLC

(57) ABSTRACT

Device and method for cleaning board erasers are provided. The device includes a case, one or more cleaning boxes, a flushing mechanism, one or more pressing parts and a rotating mechanism. Each cleaning box is configured for holding and cleaning a board eraser. The flushing mechanism includes a piping and a first power member for pumping water into the cleaning boxes to flush and clean the board erasers placed in the cleaning boxes. The rotating mechanism is configured to drive the cleaning boxes to rotate to set in an initial state or a working state. In the initial state, a user can put a board eraser into a cleaning box. In the working state, the board eraser in the cleaning box can be flushed and cleaned, and can be pressed by the pressing part to squeeze out water in the board eraser.

10 Claims, 7 Drawing Sheets

(56) References Cited

U.S. PATENT DOCUMENTS

| | | | | | | |
|---|---|---|---|---|---|---|
| 699,957 | A | * | 5/1902 | Jones | A47L 11/36 | 15/5 |
| 715,705 | A | * | 12/1902 | Stutt et al. | B08B 7/02 | 15/91 |
| 754,220 | A | * | 3/1904 | Jones | A47L 11/36 | 15/5 |
| 906,983 | A | * | 12/1908 | Adams | B08B 7/02 | 15/91 |
| 1,006,385 | A | * | 10/1911 | Jones | A47L 13/502 | 15/311 |
| 1,191,387 | A | * | 7/1916 | Baumgart | G03D 15/00 | 15/308 |
| 1,279,350 | A | * | 9/1918 | Jones | D06G 1/00 | 15/309 |
| 1,472,060 | A | * | 10/1923 | Evans | B43L 21/02 | 15/309 |
| 1,594,833 | A | * | 8/1926 | Hausten | B43L 21/02 | 15/308 |
| 1,597,572 | A | * | 8/1926 | Bernier | B43L 21/02 | 15/306.1 |
| 1,667,431 | A | * | 4/1928 | Meyers | B43L 21/02 | 15/142 |
| 1,757,545 | A | * | 5/1930 | Palmer | B43L 21/02 | 15/311 |
| 1,844,722 | A | * | 2/1932 | Tait | B43L 21/02 | 15/303 |
| 2,306,911 | A | * | 12/1942 | Schaefer | B43L 21/02 | 15/311 |
| 2,360,300 | A | * | 10/1944 | Ritter | B43L 21/02 | 15/303 |
| 2,874,398 | A | * | 2/1959 | Di Persio | B43L 21/02 | 15/94 |
| 3,066,345 | A | * | 12/1962 | Kasper | A47L 7/0047 | 15/310 |
| 3,805,312 | A | * | 4/1974 | Wu | A47L 13/50 | 248/910 |
| 4,099,286 | A | * | 7/1978 | Ishikawa | A46B 17/06 | 220/908 |
| 4,392,268 | A | * | 7/1983 | Bueno | A47L 25/00 | 15/91 |
| 4,549,327 | A | * | 10/1985 | Johnson | B43L 21/02 | 15/104.001 |
| 5,075,915 | A | * | 12/1991 | Rodriguez | B43L 19/00 | 15/77 |
| 5,274,869 | A | * | 1/1994 | Hung | B43L 21/02 | 15/88.4 |
| 5,455,976 | A | * | 10/1995 | Kim | B43L 21/02 | 15/311 |
| 11,951,765 | B1 | * | 4/2024 | Yang | B43L 19/0037 | |

FOREIGN PATENT DOCUMENTS

| | | | |
|---|---|---|---|
| CN | 101920253 | A | 12/2010 |
| CN | 101927241 | A | 12/2010 |
| CN | 102284439 | A | 12/2011 |
| CN | 104646325 | A | 5/2015 |
| CN | 207126847 | U | 3/2018 |
| CN | 107952712 | A | 4/2018 |
| CN | 208428858 | U | 1/2019 |
| CN | 210788371 | U | 6/2020 |
| JP | 2004224020 | A | 8/2004 |
| JP | 2004255344 | A | 9/2004 |
| JP | 2009006688 | A | 1/2009 |
| JP | 2009274227 | A | 11/2009 |
| KR | 20190045970 | A | 5/2019 |

OTHER PUBLICATIONS

Certified Copy of Priority Document CN 202111164340.4 (Year: 2021).*

* cited by examiner

DEVICE AND METHOD FOR CLEANING BOARD ERASERS

CROSS-REFERENCE TO RELATED APPLICATIONS

This application is a continuation application of International Application No. PCT/CN2022/114559, filed on Aug. 24, 2022 and entitled "device and method for cleaning board erasers", which claims priority to Chinese Patent Application No. CN 202111164340.4 entitled "device for cleaning board erasers" and Chinese Patent Application No. CN 202111160749.9 entitled "method for cleaning board erasers", both of which were filed on Sep. 30, 2021. The disclosures of the aforementioned applications are hereby incorporated herein by reference in their entireties.

TECHNICAL FIELD

The present disclosure relates to cleaning technology and, more specifically, to devices and methods for cleaning board erasers.

BACKGROUND

Currently, blackboards may be used for teaching in schools. During teaching, a teacher can use chalks to write on a blackboard and the writing can be cleaned by a board eraser. For example, before the next lesson, the chalk writing of the previous lesson can be cleaned by the board eraser. When the chalk writing is cleaned by the board eraser, a great deal of chalk dust may float into air. If the chalk dust is inhaled by teachers and students, their healthy will be adversely affected. To solve this problem, in the prior art, a container holding water may be provided. Before cleaning the chalk writing using the board eraser, a foam portion of the board eraser can be washed and moistened in the container. The foam portion is the work department of the board eraser which is generally made of flexible material such as foam and sponge. When cleaning the chalk writing using the board eraser, the moistened foam portion contacts the surface of the blackboard to erase the chalk writing.

A problem that needs to be solved is: in the process of washing the foam portion, the hands of a user such as a teacher or a student need to contact the foam portion and be put into water containing chalk dust, which is harmful to the health of the user. For example, the user may be allergic to the chalk dust. In addition, this manual way of washing foam portion by the user is inefficient and cleaning the blackboard takes lots of time of the user.

SUMMARY

This and other problems are generally solved or circumvented, and technical advantages are generally achieved, by embodiments of the present disclosure which provides devices and methods for cleaning board erasers.

Technical Problems

The present disclosure provides devices and methods for cleaning board erasers to at least solve the problem that the manual way of washing foam portion in the prior art is harmful to health and takes lots of time of the user.

Technical Solutions

The present disclosure provides devices for cleaning one or more board eraser. In an embodiment, a device for cleaning one or more board eraser may include a case, one or more cleaning boxes, a flushing mechanism, one or more pressing parts and a rotating mechanism.

The inner of the case is provided as an accommodating cavity. A side wall or a top wall of the case is provided with one or more first openings that are in communication with the accommodating cavity.

The cleaning box(es) are arranged in the case. The number of the cleaning box(ex) is same as the number of the first opening(s) of the case, and the cleaning box(ex) corresponds one-to-one to the first opening(s). Each cleaning box is configured for cleaning a board eraser placed in it. Each cleaning box is provided with a second opening for placing one board eraser in it. When the second opening of a cleaning box faces towards and is aligned with the corresponding first opening of the case, a board eraser can be placed into the cleaning box by passing through the first opening and the second opening. Two opposite side walls of each cleaning box are provided with a water inlet and a water outlet, respectively. Water can enter the cleaning box from the water inlet to clean the board eraser placed in the cleaning box, and wastewater can be discharged from the water outlet.

The flushing mechanism includes a piping and a first power member. The piping connects the water inlet of each cleaning box with a water source. The first power member which may be a pump is connected with the piping and is configured to supply impetus to water in the piping, such that the water can flush the board eraser placed in the cleaning box(es). The first power member may be arranged on the inner side wall or the outer side wall of the case.

The pressing part(s) are arranged in the case and are slidable. The number of the pressing part(s) is same as the number of the cleaning box(es), and the pressing part(s) corresponds one-to-one to the cleaning box(es). Each pressing part is provided with a pressing surface that faces towards a corresponding cleaning box. Each pressing part is connected with a second power member that is configured to drive the pressing part connected with it to slide.

The rotating mechanism is arranged in the case. The rotating mechanism is provided with a rotating driving end that is connected with each cleaning box. The rotating driving end of the rotating mechanism is configured to drive each cleaning box to rotate a preset angle, such that each cleaning box is in an initial state or a working state.

When a cleaning box is in the initial state, the second opening of the cleaning box faces towards and is aligned with a corresponding first opening of the case, such that a board eraser can be placed into the cleaning box by passing through the corresponding first opening and the second opening.

When a cleaning box is in the work state, the second opening of the cleaning box faces towards to and is aligned with a corresponding pressing part, such that the board eraser placed in the cleaning box can be pressed by the corresponding pressing part. When the pressing part press the board eraser, the erasing part of the board eraser which is flexible is squeezed, such that the water in the erasing part is squeezed out while the water carries away the dusts attached on the erasing part. The wastewater generated by flushing the board eraser(s) may be held/carried by the case and stored in the accommodating cavity of the case.

The present disclosure further provides methods for cleaning one or more erasers by using the devices mentioned above. In an embodiment, a method for cleaning one or more erasers includes the following steps:

S101: placing the one or more board erasers in one or more cleaning boxes of the cleaning device, where the cleaning device includes a rotating mechanism, one or more pressing parts and a cleaning mechanism, the pressing part(s) face towards the cleaning box(es) and the cleaning box(es) are connected with the rotating mechanism;

S102: driving the cleaning box(es) to rotate to a cleaning position through the rotating mechanism;

S103: flushing the board eraser(s) in the cleaning box(es) by the cleaning mechanism, and pressing the board eraser(s) by the pressing part(s);

S104: flushing and repeatedly pressing the board eraser(s) in a first preset time; and S105: driving the cleaning box(es) to rotate to an initial position through the rotating mechanism.

Advantageous Effects of the Disclosure

The advantageous effects of the devices and methods for cleaning one or more board erasers provided by the present disclosure are as follows. Automatic cleaning of the board eraser is realized through the case, the one or more cleaning boxes and the flushing mechanism working together. During the automatic cleaning, there is no need that the hands of the user contact the wastewater containing chalk dust, so as to avoid the health of the user being damaged. In addition, the cleaning of the board eraser is completed automatically which don't take time and efforts of the user, thus the problem that the manual washing takes lots of time of user is solved. When the cleaning boxes are driven to the working state, in the flushing process, the board erasers in the cleaning boxes can be pressed and released in several times by the pressing parts, such that the water in the erasing part of the board eraser can be squeezed out repeatedly and the dusts in the board eraser can be taken away sufficiently by the water.

DETAILED DESCRIPTION OF ILLUSTRATIVE EMBODIMENTS

In order to make the technical problems to be solved, technical solutions and advantageous effects of the present disclosure more clearly, the present disclosure is described in detail below in conjunction with drawings and embodiments. However, it should be understood that the specific embodiments described below are merely illustrative, and do not limit the present disclosure.

Figure 1:
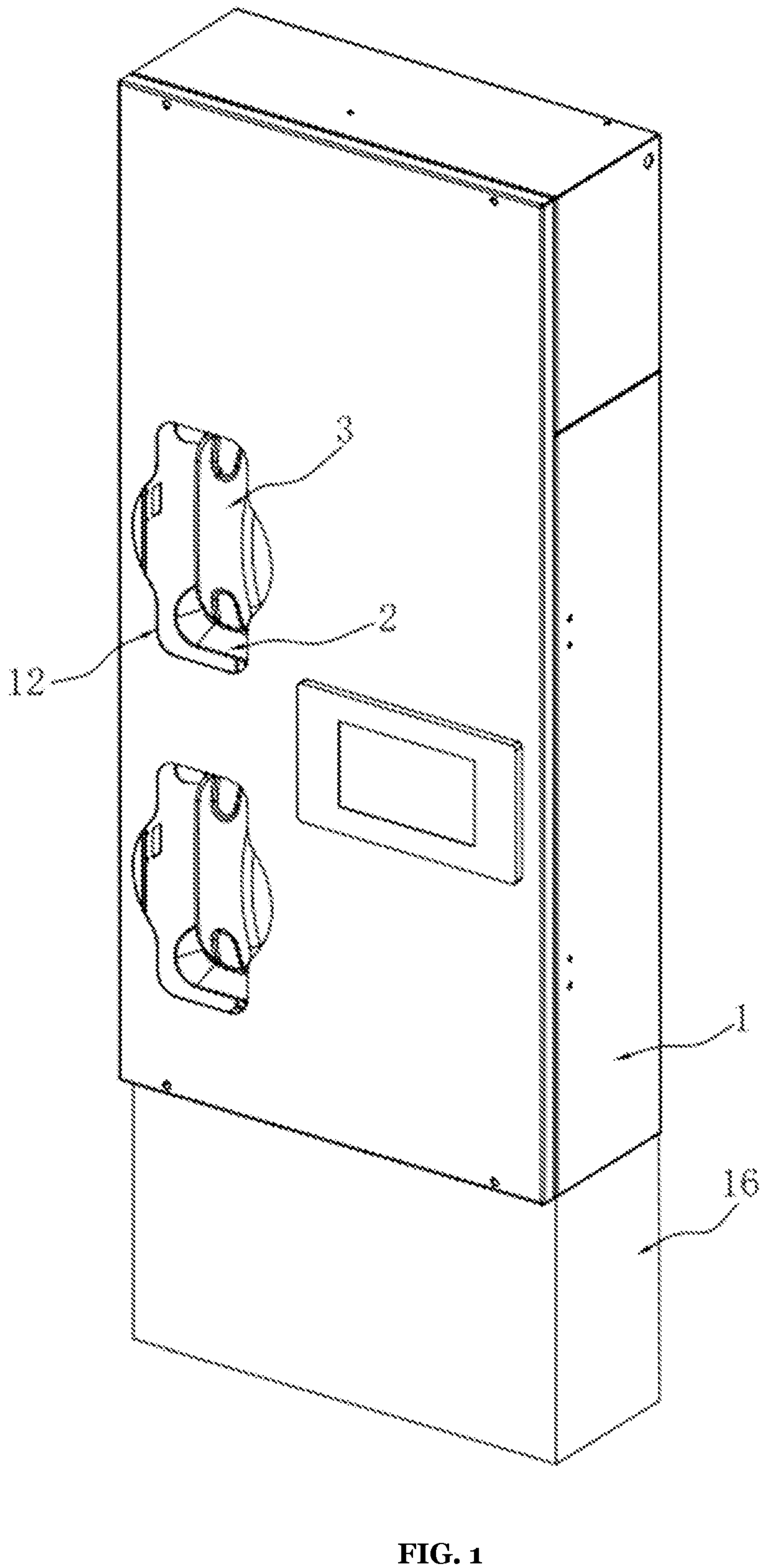
FIG. 1 is a perspective view of a device for cleaning one or more board erasers according to embodiments of the present disclosure.
Figure 2:
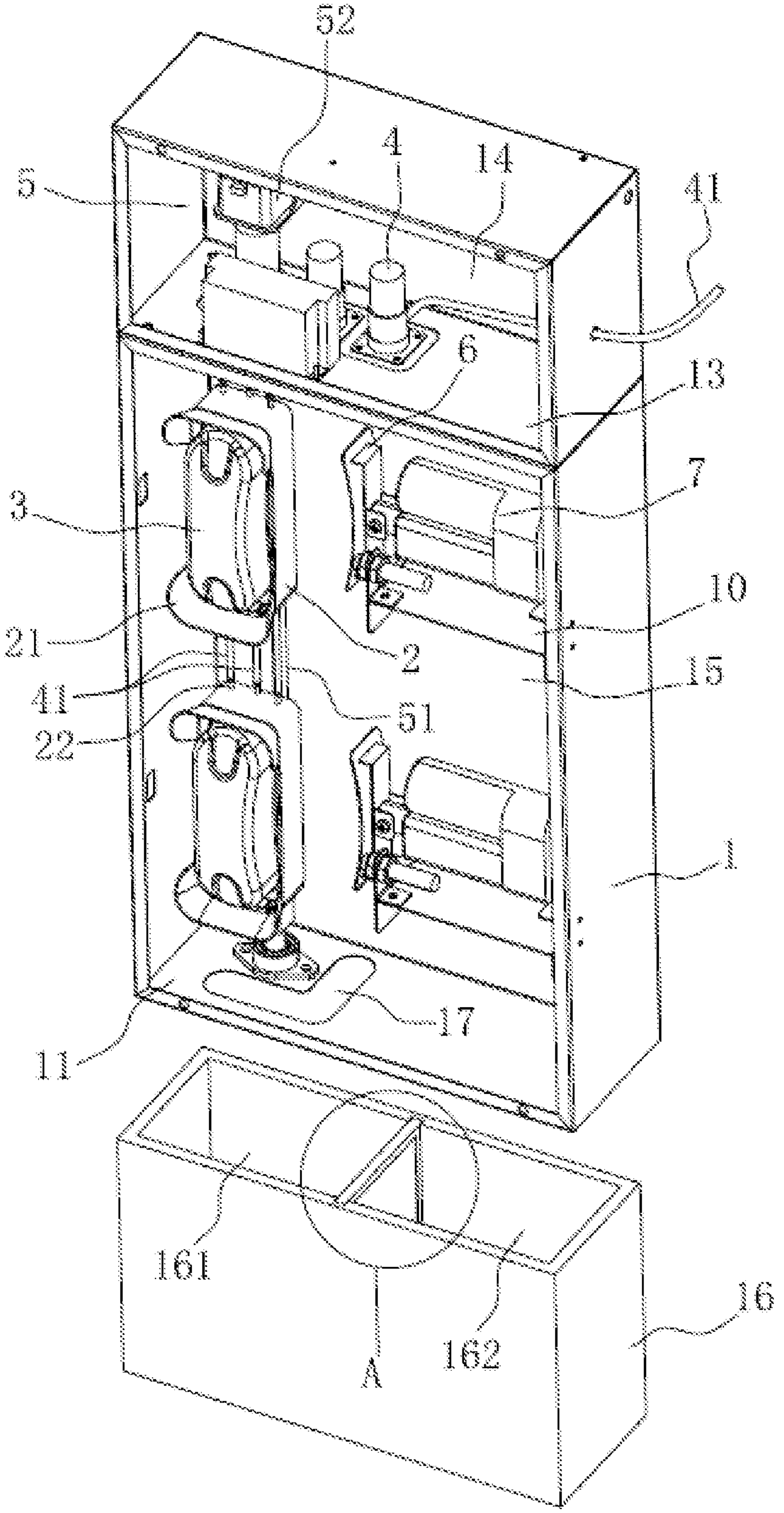
FIG. 2 is a perspective view of the inner of a device for cleaning one or more board erasers according to embodiments of the present disclosure.
Figure 5:
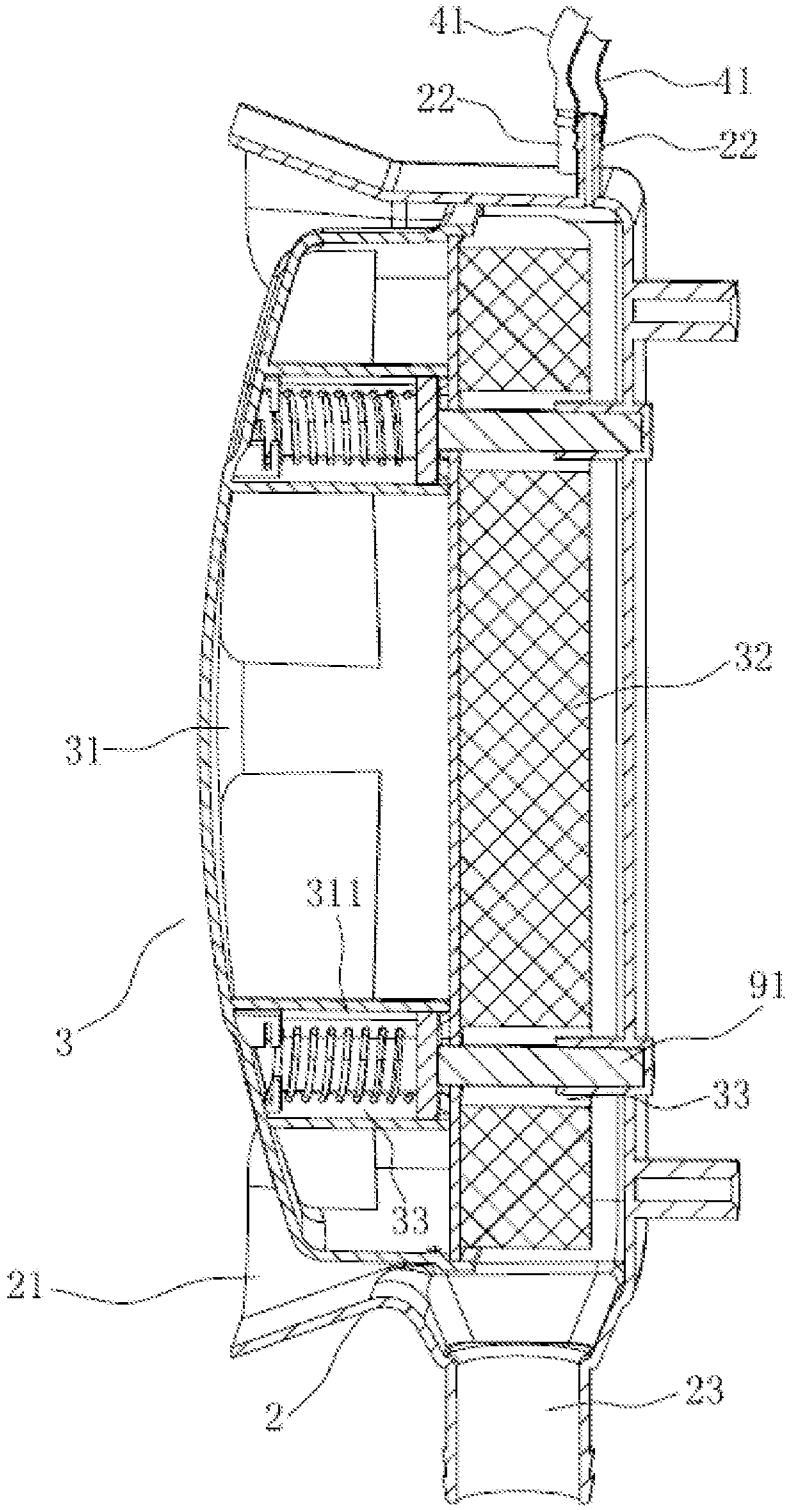
FIG. 5 is a section view of a cleaning box with a board eraser in it according to embodiments of the present disclosure.

Referring to FIGS. 1, 2 and 5, a device for cleaning one or more board erasers provided by an embodiment of the present disclosure is described below. The device may include a case 1, one or more cleaning boxes 2 and a flushing mechanism. The inner of the case 1 is provided as an accommodating cavity 11. A side wall or the top wall of the case 1 is provided with one or more first openings 12 that are in communication with the accommodating cavity 11. In FIG. 1, the front side wall of the case 1 is provided with two first openings 12. Each cleaning box 2 is suitable for holding a board eraser 3 after it is placed into the cleaning box 2. The cleaning boxes 2 are arranged in the accommodating cavity 11. Each cleaning box 2 is provided with a second opening 21 for placing board eraser. The second opening 12 can be aligned with a corresponding first opening 12. When the second opening 21 of a cleaning box is aligned with the corresponding first opening 12, a board eraser can be placed into the cleaning box 2 by passing through the first opening 12 and the second opening 21. Two opposite side walls of each cleaning box 2 are provided with a water inlet 22 and a water outlet 23, respectively. The flushing mechanism may include one or more pipings 41 and a first power member 4. A first end of a piping 41 is connected with the water inlet 22 of each cleaning box 2. A second end of the piping 41 is connected with a water source. The first power member 4 may be arranged on the inner wall or the outer wall of the case 1. The first power member 4 is connected with the piping 41 and is configured to supply impetus to the water in the piping 41. That is, the first power member 4 is configured to drive the water in the piping 41 to flow. When board erasers 3 are being cleaned, the wastewater generated as result of flushing the board erasers 3 using the flushing mechanism can be hold by the case 1 and stored in the accommodating cavity 11 of the case 1.

A board eraser 3 can be cleaned by the following steps by using the device provided in the present embodiment:

Firstly, placing the board eraser 3 into a cleaning box 2 by passing the board eraser 3 through a first opening 12 of the case 1 and the second opening 21 of the cleaning box 2 which corresponds to the first opening 12;

Secondly, supplying impetus to the water in the piping 41 by the first power member 4, such that the water in the piping is driven to flow and enters the cleaning box 2 from the water inlet 22, then flow through the board eraser 3 placed in the cleaning box 2 and flow out of the cleaning box 2 from the water outlet 23; when the water flow through the board eraser 3, the dusts attached on the board eraser 3 can be carried away by the water, such that the cleaning of the board eraser 3 is realized; and Thirdly, holding the wastewater generated as result of flushing the board eraser 3 using the case 1, such that the wastewater is stored in the accommodating cavity 11 and the collection of the wastewater is realized.

Compared with the prior art, advantageous effects of the device for cleaning one or more board erasers are as follows. Automatic cleaning of the board erasers 3 is realized through the case 1, the one or more cleaning boxes 2 and the flushing mechanism working together. During the automatic cleaning, there is no need that the hands of the user contact the wastewater containing chalk dust, so as to avoid the health of the user being damaged. In addition, the cleaning of the board erasers 3 is completed automatically which don't take time and efforts of the user, thus the problem that the manual washing takes lots of time of user is solved.

In addition, as shown in FIGS. 1 and 2, the case 1 can be equipped with two board erasers 3, such that when the first board eraser 3 is put in the cleaning box 2 for cleaning, the second eraser 3 is available for use. After the second eraser 3 is used and put into the cleaning box 2, the first board eraser 3 which has been cleaned is in turn available for use. In this way, there is at least one cleaned board eraser 3 available for use at any time, and users do not have to waste time waiting for a board eraser 3 to be cleaned. Alternatively, the number of board erasers 3 equipped may also be greater than two.

When the first openings 12 is arranged on one side of the case 1 (as shown in FIG. 1), the case 1 can be embedded into the wall of a classroom meanwhile the first openings 12 is exposed such that a board eraser 3 can be put into a cleaning box 2 through the first opening 12 corresponding to the cleaning box 2 to realize automatically washing. By embedding the case 1 into the wall of the classroom, the space required to place the case 1 can be saved. Alternatively, the first power member 4 may be water pump which can provide power to the water in the piping 41, such that water in the piping 41 can continuously flow and flush the board erase(s) 3 in the cleaning box(es) 2.

Figure 4:
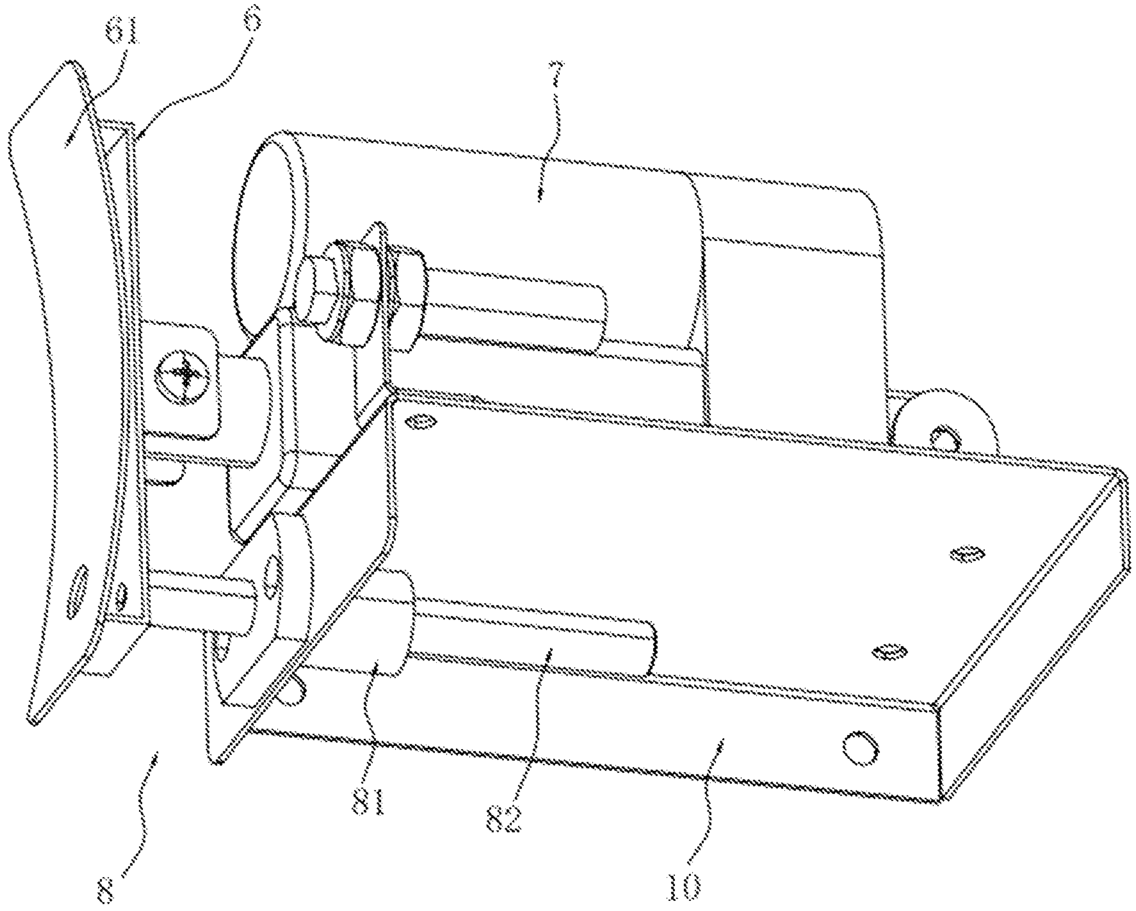
FIG. 4 is a perspective view of a pressing part with a second power member and a guide structure according to embodiments of the present disclosure.

In an embodiment, the piping 41 is flexible and the device for cleaning board eraser(s) further includes, as shown in FIGS. 2 and 4, a rotating mechanism 5, one or more pressing parts 6 and one or more second power members 7. The rotating mechanism 5 is arranged in the accommodating cavity 11 of the case 1 and is provided with a rotating driving end connected with an outer wall of each cleaning box 2. The rotating driving end is configured for driving each cleaning box 2 to rotate a preset angle, such that each cleaning box 2 can move to an initial state or a working state. Each pressing part 6 is slidably arranged in the accommodating cavity 11 of the case 1. The sliding direction of each pressing part 6 is perpendicular to the normal direction of the corresponding first opening 12. Actually, the normal direction of a first opening 12 is, as shown in FIG. 1, the normal direction of the plate of the case 1 provided with the first opening 12. Each pressing part 6 is provided with a pressing surface 61 towards a corresponding cleaning box 2. Each pressing part 6 is connected with a second power member 7 to be driven to move. The second power member 7 is connected with the inner wall of the case 1. The second power member 7 includes a driving end connected with the corresponding pressing part 6. When a cleaning box 2 is in the initial state, the second opening 21 of the cleaning box 2 faces towards and is aligned with a corresponding first opening 12 of the case 1, such that a board eraser 3 can be placed into the cleaning box 2. When a cleaning box 2 is in the working state, the second opening 21 of the cleaning box 2 faces towards and is aligned with a corresponding pressing part 6, such that the board eraser 3 placed in the cleaning box can be pressed by the corresponding pressing part 6.

When a cleaning box 2 is driven by the rotating mechanism 5, the cleaning box 2 and the board eraser 3 in it can rotate to the work state in which the second opening 21 of the cleaning box 2 faces towards and is aligned with a corresponding pressing part 6, such that the board eraser 3 in the cleaning box 2 can be pressed by the corresponding pressing part 6. In the process of flushing the board eraser 3 in the cleaning box 2, the second power member 7 can drive the pressing part 6 to approach and press the board eraser 3, and then drive the pressing part 6 to move away from and release the board eraser 3. When the board eraser 3 is pressed by the pressing part 6, the water in the board eraser 3 is squeezed out while the water carries away the dusts attached on the board eraser 3, such that better washing of the board eraser 3 is realized. When the board eraser 3 is released, it absorbs water again in preparation for the next press and squeeze. The second power member 7 can drive the pressing part 6 to reciprocating slide, such that the pressing part 6 can repeatedly press and release the board eraser 3 by several times to realize multiple times squeeze and sufficient clean of the board eraser 3. Using the board eraser 3 which is sufficiently cleaned, a blackboard can be better cleaned. Compared with only flushing with water, multiple times squeeze can improve the cleaning quality of the board eraser 3 and fully meet the needs of users.

It is easy for those skilled in the art to understand that it is generally the erasing part 32 of the board eraser 3 that is squeezed. As shown in FIG. 5, a board eraser 3 generally includes a handholding part 31 and an erasing part 32. The erasing part 32 may be made of flexible material, such as foam and sponge which is not only suitable for wiping blackboard, but also has the characteristics of good elasticity and good water absorption. When the erasing part 32 is not pressed and squeezed, it can absorb water, and when pressed, the water absorbed by the erasing part 32 is squeezed out. From the time it is pressed to the time it is released, the erasing part 32 is able to restore its shape with its own elasticity.

As shown in FIGS. 2 and 5, a cleaning box 2 may be provided with two or more water inlets 22 arranged, respectively, on two sides of the rotating shaft 51. In this way, the piping 41 needs to be flexible so that it can change its own shape with the rotation of the cleaning boxes 2. It should be noted that, by conventional means in the art, the water inlet 22 may be coaxial with the rotating shaft 51. In this case, the piping can be hard and not easily deformed. A comb-shaped grid may be arranged in the water inlet 22 to disperse the water flowing into the cleaning box 2, so that the water flow is distributed more evenly and produces a better cleaning effect.

In an embodiment, the pressing surface 61 of a pressing part 6 is a concave surface that matches the outer surface of the board eraser 3 which is generally the back surface of the board eraser 3 while the erasing surface of the erasing part 32 is the front surface of the board eraser 3. This increases the contact area between the pressing surface 61 and the board eraser 3, improves the stability of the contact between the pressing part 6 and the board eraser 3, and ensures that the pressing surface 61 and the board eraser 3 will not slide relative to each other during the process of the board eraser 3 being pressed by the pressing part 6. Steady pressing can produce a steady pressing force, which improves the cleaning quality of the board eraser 3.

In the present embodiment, each cleaning box 2 may be provided with one pressing part 6, the pressing surface 61 of which can cover the back surface of the board eraser 3 and the area of the pressing surface 61 is approximately equal to the area of the back surface of the board eraser 3. In a variant, each cleaning box 2 may be provided with two pressing parts, the pressing surface of which is smaller and the area of the pressing surface is approximately equal to half of the area of the back surface of the board eraser 3.

In an embodiment, the rotation angle of the cleaning box 2 may be 90 degrees (i.e., the preset angle mentioned above is 90 degrees). As shown in FIG. 2, the back surfaces of the board erasers 3 in the cleaning boxes 2, after rotating 90 degrees driven by the vertical rotating shaft 51, will face towards and are aligned with the pressing parts 6. In a variant, the rotation angle of the cleaning boxes 2 may be another value instead of 90, according to the required orientation of the second opening 21. Rotation angles which can serve the purpose that the back surface of the board eraser 3 can face towards and be aligned with the first opening 12 and the pressing part 6, respectively, before and after the rotation of the cleaning box 2, are within the scope of protection of the present disclosure.

In an embodiment, as shown in FIGS. 2 and 4, each second power member 7 includes an electric actuator arranged on the inner wall of the case 1, and the electric actuator is provided with a driving end connected with the corresponding pressing part 6. Electric actuator is an industrial product widely used with good performance and low purchase cost. The pressing part 6 can reciprocating slide in a straight line driven by the electric actuator, thus can repeatedly press and release the board eraser 3 to realize the sufficient clean of the board eraser 3.

In a variant, the second power member 7 may be a cylinder driven by air or hydraulic fluid. Structural forms of the second power member 7 without creative efforts are all within the scope of protection of the present disclosure.

In an embodiment, as shown in FIG. 2, the rotating mechanism 5 may include a rotating shaft 51, one or more connection members and a third power member 52. The rotating shaft 51 is vertically arranged in the accommodating cavity 11 and is rotatable, and it is connected with the case 1. Each connection member is provided with a first connection end connected with the outer wall of one of the cleaning boxes 2 and a second connection end connected with the outer wall of the rotating shaft 51. The cleaning boxes 2 are fixed on the rotating shaft 51 through the connection members. The third power member 52 is arranged on the inner or outer wall of the case 1. The third power member 52 is provided with a driving end as the rotating driving end of the rotating mechanism 5. The rotating driving end is connected with an end of the rotating shaft 51.

The connection member may be a bolt. The outer wall of each cleaning box 2 may be provided with a threaded hole matching the bolt. A through hole can be arranged in the rotating shaft 51 which can be aligned with the threaded hole. The bolt can pass through the through hole in the rotating shaft 51 and screw into the threaded hole in the cleaning box 2, such that the cleaning box 2 is fixed on the rotating shaft 51. Generally, the bolt is perpendicular to the rotating shaft 51 and the outer wall of the cleaning box 2. The driving end of the third power member 52 is fixedly connected with the rotating shaft 51 to drive it to rotate. The cleaning boxes 2 are fixed on the rotating shaft 51, therefore when the rotating shaft 51 rotates driven by the third power member 52, the cleaning boxes 2 will rotate with the rotating shaft 51. Rotating by the preset angle, the cleaning boxes 2 can toggle between the initial state (in which the second opening 21 of each cleaning box 2 is aligned with the corresponding first opening 12 of the case 1) and the work state (in which the second opening 21 of each cleaning box 2 is aligned with the corresponding pressing part 6). It should be noted that the struct and composition of the rotating mechanism 5 is just an example. Other structs and compositions of the rotating mechanism 5 without creative efforts are all within the scope of protection of the present disclosure. For example, in a variant, the rotating mechanism may include a crank mechanism which is conventional technology. In this variant, compared with the power output end of the third power member 52 being connected directly with the rotating shaft 51 mentioned above, the power output end of the third power member may be connected with the rotating shaft 51 through a crank and a rotary plate which is coaxially fixed on the rotating shaft 51. One end of the crank may be connected with the power output end of the third power member 52, and the other end of the crank is connected with the outer edge of the rotary plate. When the crank is driven by the third power member 52, the crank drives the rotary plate to rotate, thus the rotating shaft 51 is driven to rotate. It is unnecessary that the rotary plate is arranged at the end of the rotating shaft 51 which thus can be exposed. The exposed end of a hollow rotating shaft may be provided as a water inlet through which water in the piping can flow into the cleaning boxes 2. In this way, the rotating shaft is no longer needed to be arranged behind the cleaning boxes 2 as shown in FIG. 2, and it should be connected with the upper plate of each cleaning box 2, where the rotating shaft is hollow and is aligned with the water inlet arranged on the upper plate of each cleaning box 2, which is not shown in the Figures.

In an embodiment, as shown in FIG. 2, the case 1 is provided with a divider plate 13 in it, which divides the accommodating cavity 11 to an upper cavity 14 and a lower cavity 15. The divider plate 13 is closer to the top of the accommodating cavity 11. The third power member 52 may be a motor fixed on the inner wall of the upper cavity 14. A water pump as the first power member 4 may be fixed on the divider plate 13. The case 1 may be provided with one or more through holes, through which the piping 41 can enter into the case 1. The rotating shaft 51, the one or more cleaning boxes 2, the one or more pressing parts 6 and the second power member 7 are arranged in the lower cavity 15.

In an embodiment, as shown in FIG. 4, each pressing part 6 is provided with a guide structure 8 which can guide the sliding of the pressing part 6 and improve the stability of the sliding of the pressing part 6.

In an embodiment, as shown in FIGS. 2 and 4, a support 10 is fixedly arranged under each second power member 7. The support 10 is doorframe shaped and is in the accommodating cavity 11. The support 10 is configured for supporting the second power member 7. The guide structure 8 includes a sleeve 81 and a guide rod 82. The sleeve 81 is arranged in the support 10. The axial direction of the sleeve 81 is same as the sliding direction of the corresponding pressing part 6. The sleeve 81 faces towards the corresponding pressing part 6, that is, the opening of an end of the sleeve 81 is aligned with the corresponding pressing part 6. One end of the guide rod 82 is fixedly connected with the corresponding pressing part 6 and the other end of the guide rod 82 passes through the sleeve 81. The guide rod 82 is matched with the sleeve 81 and is slidable in the axial direction of the sleeve 81. Through the cooperation of the sleeve 81 and the guide rod 82, the sliding of the pressing part 6 can be guided, so that the stability of the sliding of the pressing part 6 is improved.

Figure 6:
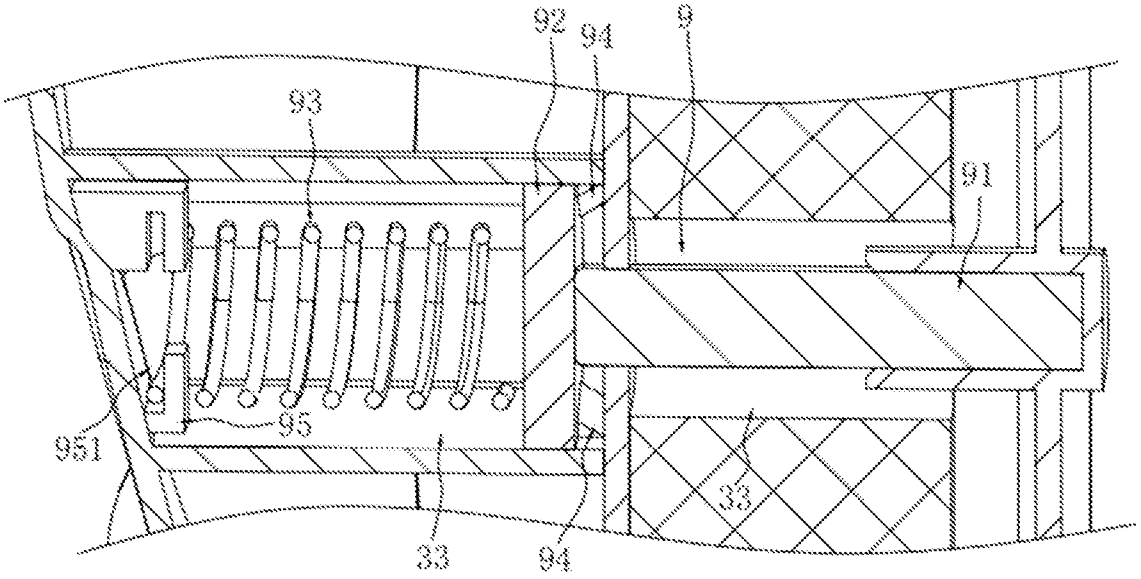
FIG. 6 is enlarged view of a portion of FIG. 5 near a positioning rod and a positioning hole.

In an embodiment, as shown in FIGS. 5 and 6, each cleaning box 2 is provided with a positioning structure 9 for positioning a board eraser 3. The positioning structure 9 can position the relative position of the cleaning box 2 and the board eraser 3, so that the board eraser 3 will not be displaced excessively in the directions other than the direction in which it is pressed. That is, the positioning structure 9 is used to keep the board eraser 3 in a right position and avoid excessive displacement thereof, so as to ensure that the pressing part 6 can always be aligned with the board eraser 3 in the pressing process.

As shown in FIGS. 5 and 6, a board eraser 3 may generally include a handholding part 31 and an erasing part 32. There is a gap between the erasing part 32 and the side wall of the cleaning box 2 to ensure that in the process of putting the board eraser 3 into the cleaning box 2, the erasing part 32 will not contact with and be rubbed with the side wall of the cleaning box 2, so that the board eraser 3 can be quickly and smoothly put into the cleaning box 2. After being placed in the cleaning box 2, the erasing part 32 is surrounded by the side wall of the cleaning box 2, and the dust in the erasing part 32 cannot leak out from the second opening 21 of the cleaning box 2. The diameter of the water outlet 23 may be greater than the thickness of the erasing part 32, so that the wastewater generated by cleaning the board eraser 3 can be discharged in time and will not flow out from the second opening 21 of the cleaning box 2.

As shown in FIGS. 5 and 6, both the handholding part 31 and the erasing part 32 are provided with one or more (two in FIG. 5) positioning holes 33 and each positioning hole 33 of the handholding part 31 is aligned with a corresponding positioning hole 33 of the erasing part 32, such that a positioning hole 33 of the board eraser 3 is formed. In an embodiment, the positioning structure 9 includes one or more positioning rods 91. One end (the first end) of each positioning rod 91 is connected with the bottom of the cleaning box 2, and the other end (the second end) of the position rod 91 is configured to be inserted into a corresponding positioning hole 33 arranged in the board eraser 3 to position the board eraser 3. A space 311 for sliding is formed between the second end of the positioning rod 91 and the bottom of the corresponding positioning hole 33 of the board eraser 3.

The positioning rod 91 may be horizontal. When the positioning rods 91 are inserted into the positioning holes 33, the board eraser 3 is positioned and limited in the cleaning box 2. The FIG. 5 shows a board eraser 3 that is not pressed. When pressed, the board eraser 3 can move relative to positioning rods 91 in the direction of its own thickness (i.e., the axial direction of each positioning rod 91), because there is the space 311 between the second end (the left end in FIG. 5) of each positioning rod 91 and the bottom of the positioning hole 33. Thus, the erasing part 32 of the board eraser 3 is squeezed, its thickness becomes smaller, and the water in it is squeezed out. When pressed, the erasing part 32 deforms elastically; and when the pressing part 6 no longer presses the board eraser 3 and the board eraser 3 is released, in the present embodiment, the erasing part 32 will return to its original shape as shown in FIG. 5 by its own elasticity. As mentioned above, the positioning structure 9 can keep the board eraser 3 in a right position and avoid excessive displacement thereof; here, the board eraser 3 can be kept in the right position in the process of erasing part 32 returning to its original shape, because the positioning rods 91 inserted in the positioning holes 33 can perform guiding and positioning to the board eraser 3, to ensure that the board eraser 3 will not be excessively displaced in the direction of non-thickness direction.

In an embodiment, as shown in FIGS. 5 and 6, the positioning structure 9 further includes one or more magnetic pieces 92 and one or more elastic members 93 which are arranged in the positioning holes 33 of a board eraser 3, specifically in the positioning holes 33 of the handholding part 31 of the board eraser 3. Preferably, each positioning hole 33 is provided with a magnetic piece 92 and an elastic member 93. In this embodiment, the positioning rods 91 are magnetic. The second end (the left end in FIGS. 5 and 6) of the positioning rod 91 is configured to be magnetically attached to the magnetic piece 92. The first end (the right end in FIGS. 5 and 6) of the elastic member 93 is connected with the magnetic piece 92, and the second end (the left end in FIGS. 5 and 6) of the elastic member 93 is connected with the bottom of the corresponding positioning hole 33.

The elastic member 93 may be a spring, the two ends of which are fixedly connected with the magnetic piece 92 and the bottom of the positioning hole 33, respectively. After the board eraser 3 is placed in the cleaning box 2, the positioning rods 91 fixedly arranged in the cleaning box 2 are inserted into the positioning holes 33 of the board eraser 3 and each magnetic piece 92 is magnetically attached to the second end of the corresponding positioning rod 91. Therefore, the magnetic pieces 92 will not be unexpectedly detached with the positioning rods 91, such that the stability of keeping the board eraser 3 in the cleaning box 2 is improved to prevent the board eraser 3 from accidentally falling from the cleaning box 2, especially during the rotation of the cleaning box 2 and the process when the board eraser 3 is repeatedly pressed and released. It is easy to understand that the magnitude of the magnetic attraction force between the magnetic positioning rods 91 and the magnetic pieces 92 is moderate, and a user can easily overcome this magnetic attraction force to take out the board eraser 3 from the cleaning box 2. As shown in FIG. 6, generally, the magnetic piece 92 may be a round with a certain thickness, the outer side wall of which is in sliding contact with the wall of the positioning hole 33. During the extending and compressing of the spring 93, the magnetic piece 92 can slide along the axial direction of the positioning hole 33. Specifically, when the board eraser 3 is pressed, the spring 93 is compressed, and the magnetic piece 92 slides towards the back of the board eraser 3 (towards left in FIG. 6); and when the board eraser 3 is released, the spring 93 extends, and the magnetic piece 92 moves towards the front of the board eraser 3 (towards right in FIG. 6). The elastic members 93 are arranged to speed up the erasing part 32 of the board eraser 3 returning to its original shape after it is pressed. As mentioned above, the erasing part 32 may return to its original shape by its own elasticity, however, the returning speed may be low due to the small elasticity of the erasing part 32. In the present embodiment, the elastic members 93 can speed up the erasing part 32 returning to its original shape, such that it can enter the next pressing cycle quickly and the cleaning efficiency is improved.

A blocking ring may be arranged in each positioning hole 33, which is at the connecting surface between the handholding part 31 and the erasing part 32 of a board eraser 3. The blocking ring is arranged to keep the magnetic piece 92 in the handholding part 31 and prevent the magnetic piece 92 sliding into the erasing part 32. If the magnetic piece 92 slides into the erasing part 32, the erasing part 32 may be damaged by the magnetic piece 92 when the erasing part 32 is deformed, such as when used to clean a blackboard.

As shown in FIGS. 5 and 6, one blocking ring mentioned above may be replaced by several limiting blocks 94 which are arranged at the connecting surface between the handholding part 31 and the erasing part 32 of the board eraser 3. The several limiting blocks 94 in one positioning hole 33 are distributed along the circumferential direction of the positioning hole 33. Each limiting block 94 is provided with a limiting surface which can be in contact with the magnetic piece 92. The effect of the limiting block 94 is the same as that of the blocking ring, thus will not be repeated here.

The limiting blocks 94 make it possible that the magnetic piece 92 passes through the gaps, each of which is formed by two adjacent limiting blocks 94, when it is necessary to disassemble the magnetic piece 92. In this way, the magnetic piece 92 is provided with several openings arranged on the edge of the magnetic piece 92. The openings are corresponding one-to-one with the limiting blocks 94, and the openings may be aligned with the liming blocks 94 or be not aligned with the limiting blocks 94 by circumferentially rotating the magnetic piece 92. When disassembling the magnetic piece 92, the magnetic piece 92 is circumferentially rotated to make the openings of the magnetic piece 92 aligned with the limiting blocks 94, such that the magnetic piece 92 can pass through the gaps formed by the limiting blocks 94, and be taken out of the positioning hole 33 of the board eraser 3; otherwise, such as when the board eraser 3 works or is cleaned, the magnetic piece 92 is circumferentially rotated to make the openings of the magnetic piece 92 not aligned with the limiting blocks 94, such that the magnetic piece 92 cannot slide out of the position hole 33 of the handholding part 31. It is easy to understand that the opening of the magnetic piece 92 is generally matched with the limiting blocks 94.

In an embodiment, as shown in FIGS. 5 and 6, a seizing member 95 is fixed on the bottom of each positioning hole 33, which is configured to fix the elastic member 93 such as spring. Each seizing member 95 is provided with a sticking slot 951. The width of the seizing member 95 (in FIGS. 5 and 6, the width direction of the seizing member 95 is the direction perpendicular to the paper) is less than the diameter of the spring 93. The second end (the left end in FIGS. 5 and 6) of the spring can be inserted into the sticking slot 951 by rotating the spring 93. When the second end of the spring 93 is inserted into the sticking slot 951, the second end of the spring 93 is stuck by the seizing member 95 and the fixation of the spring 93 is realized.

In an embodiment, each positioning rod 91 may be connected with the bottom of the cleaning box 2 by clamping, pining or bolt. Taking bolt connection as an example, the end of the positioning rod 91, which is connected with the bottom of the cleaning box 2 may be provided with a threaded hole, the depth direction of which is same as the axial of the positioning rod 91. And the bottom of the cleaning box 2 is provided with a through hole which can aligned with the threaded hole of the positioning rod 91. When the positioning rod 91 is placed close to the bottom of the cleaning box 2 and the threaded hole of the positioning rod 91 is aligned with the corresponding through hole arranged on the bottom of the cleaning box 2, a bolt can pass through the through hole and screw into the threaded hole to realize the fixation of the positioning rod 91 on the bottom of the cleaning box 2.

Figure 3:
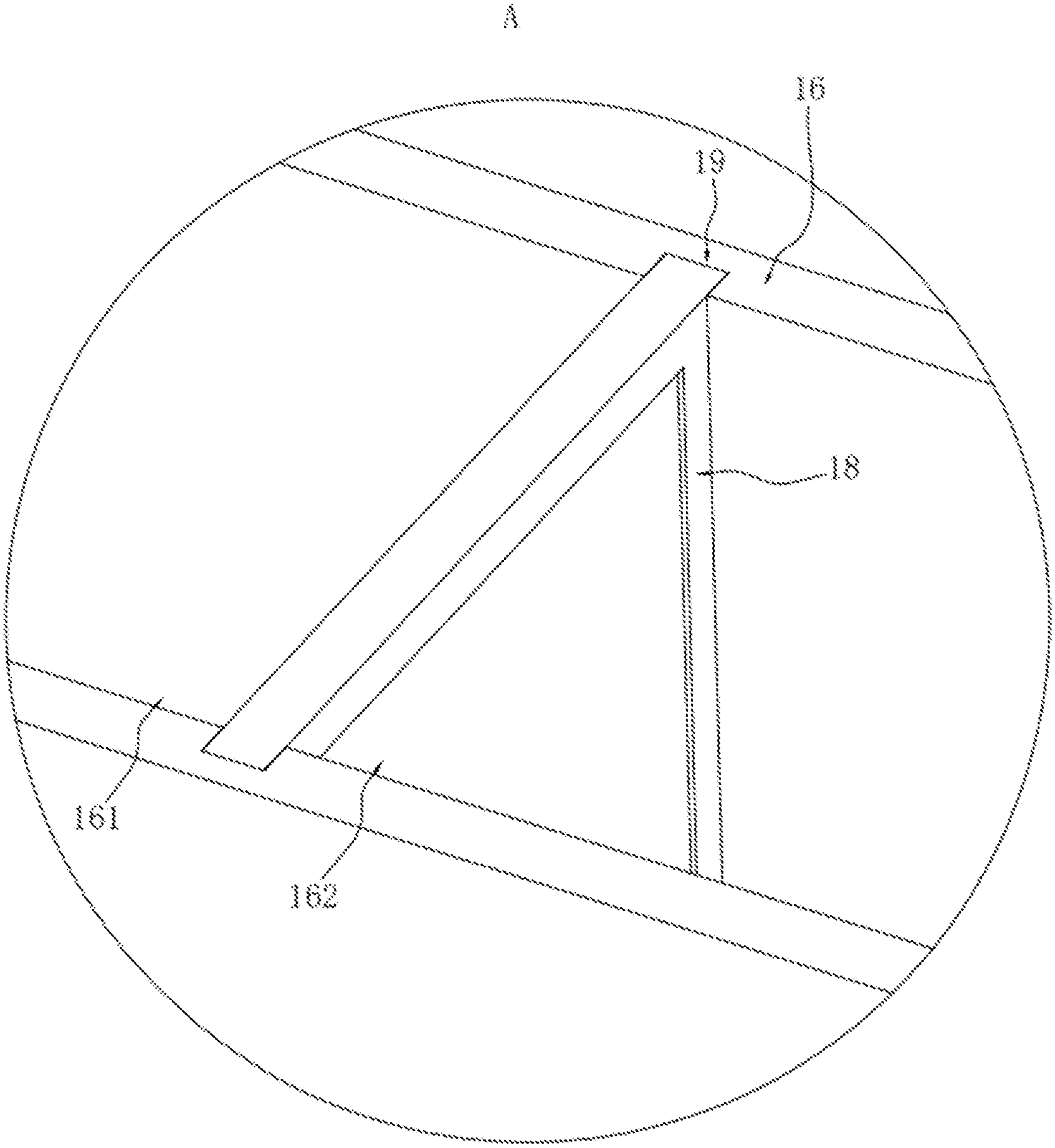
FIG. 3 is an enlarged view of part A in FIG. 2.

In an embodiment, as shown in FIGS. 2 and 3, a water tank 16 may be arranged under the case 1. The inner of the water tank 16 is divided into a wastewater part 161 and a clean-water part 162. The end of the piping, which is far away from the cleaning boxes 2, is connected with the clean-water part 162. The bottom of the case 1 is provided with a water leaking opening 17 in communication with the wastewater part 161. A filtration structure 18 may be arranged between the wastewater part 161 and the clean-water part 162.

In this embodiment, water can be recycled. The wastewater generated by flushing the board erasers 3 flows into the wastewater part 161 of the water tank 16 through the water leaking opening 17. The wastewater collected in the wastewater part 161 flows through the filtration structure 18 to be filtered, and the filtered water which is clean enters the clean-water part 162. The clean-water part 162 is connected with the cleaning boxes 2 through the piping 41, and the clean water in the clean-water part 162 can be pumped by the first power member 4 into the cleaning boxes 2 to flush the board erasers 3 in them. The wastewater generated by flushing the board erasers 3 flows out of the cleaning boxes 2 from the water outlets 23 of the cleaning boxes 2 and returns into the wastewater part 161 of the water tank 16, thus the recycle of water is realized.

The filtration structure 18 may include a frame and several layers of filter cotton arranged/disposed in the frame. The filtration structure 18 is across the inner of the water tank 16, and the wastewater part 161 and the clean-water part 162 are separated by the filtration structure 18. Two slots 19 opposite to each other are arranged on two inner walls of the water tank 16, respectively. The two slots 19 are vertical and two sides of the frame of the filtration structure 18 are inserted in the two slots 19, thus the filtration structure 18 is fixed in the water tank 16. By this way, not only the filtration structure 18 can be stably kept between the wastewater part 161 and the clean-water part 162 in the process of use, but also the replacement of the filtration structure 18 is facilitated. When replacing the filtration structure 18, at first, the water tank 16 should be separated from the case 1. Then the used filtration structure 18 is pulled out from the slots 19 of the water tank 16. Finally, the new filtration structure 18 is inserted into the slots 19, which is simple, convenient, fast and efficient.

The present disclosure further provides methods of use of the cleaning devices provided by the above embodiments, that is, methods for cleaning board erasers which are described below.

In an embodiment, a method for cleaning one or more board erasers includes the following steps:

S101: placing the one or more board erasers in one or more cleaning boxes of the cleaning device, where the cleaning device includes a rotating mechanism, one or more pressing parts and a cleaning mechanism, the pressing part(s) is towards the cleaning box(es) and the cleaning box(es) is connected with the rotating mechanism;

S102: driving the cleaning box(es) to rotate to a cleaning position through the rotating mechanism;

S103: flushing the board eraser(s) in the cleaning box(es) by the cleaning mechanism, and pressing the board eraser(s) by the pressing part(s);

S104: flushing and repeatedly pressing the board eraser(s) in a first preset time; and S105: driving the cleaning box(es) to rotate to an initial position through the rotating mechanism.

Compared with the prior art, advantageous effects of the cleaning method are as follows. Automatic cleaning of the board erasers is realized through the steps S101 to S105. During the automatic cleaning, there is no need that the hands of the user contact the wastewater containing chalk dust, so as to avoid the health of the user being damaged. In addition, the cleaning of the board eraser is completed automatically which don't take time and efforts of the user, thus the problem that the manual washing takes lots of time of the user is solved. After the board eraser 3 is put into the cleaning box 2, the cleaning box 2 is driven by the rotating mechanism 5 to rotate to the cleaning position (working state). Then the board eraser 3 in the cleaning box 2 is flushed by water supplied by the cleaning mechanism to take away the dusts attached on the board eraser 3. In the flushing process, the pressing part repeatedly presses the board eraser 3, such that the board eraser 3 is pressed and released by several times. When the board eraser 3 is pressed, water in the board eraser 3 is squeezed out and takes away the dusts on the board eraser 3. When the board eraser 3 is released, it is full of water again. Being pressed and released by several times, the board eraser 3 can be cleaned sufficiently. When the cleaning of the board eraser 3 is completed, the cleaning box 2 is driven by the rotating mechanism 5 to rotate to the initial position (initial state) in which the user can take the board eraser 3 out of the cleaning box 2.

In an embodiment, after placing the board eraser(s) in the cleaning box(es), that is, after the step S101, the cleaning method provided by the present disclosure may further include the following step: S101-1: judging whether the board eraser(s) is placed in the cleaning box(es).

The judging may be realized by one or more switches for detecting, such as a position sensor. When the board eraser is put into the cleaning box, the position sensor can generate a signal for confirming that the board eraser has been already in place. When the signal is detected, it can be judged that a board eraser which needs to be cleaned is already placed in the cleaning box. At this time, the rotating mechanism can drive the cleaning box to rotate to the cleaning position.

In this embodiment, it is realized that automatically detecting the action that placing board eraser into cleaning box. According to the detecting result, it can be automatically determined whether the rotating mechanism should drive the cleaning boxes to rotate, which improves the degree of automation of the cleaning of board eraser. Otherwise, a person input, for example by pressing a button, is required to instruct the rotating mechanism to drive the cleaning boxes to rotate. Alternatively, the automatically detecting may be executed by a Programmable Logic Controller (PLC) which is generally with a millisecond scan cycle. That means the automatically detecting discussed above can be performed almost continuously at a cycle of such as several milliseconds. Once the board eraser is already placed in the cleaning box, PLC can detect this immediately and then is ready for instructing the rotating mechanism to drive the cleaning boxes to rotate.

In an embodiment, a board eraser may be put into a cleaning box through an opening for putting arranged on the cleaning box, where after the board eraser is placed in the cleaning box, a surface for erasing of the board eraser is surrounded by an inner wall of the cleaning box, and there is a gap between the surface for erasing and the inner wall.

Please referring the embodiments of cleaning devices above, it can be realized through the positioning structure 9 shown in FIGS. 5 and 6 that the surface for erasing of the board eraser is surrounded by the inner wall of the cleaning box, and there is a gap between the surface for erasing and the inner wall.

In this embodiment, the surface for erasing of the board eraser is surrounded by the inner wall of the cleaning box, therefor, the dusts on the board eraser can be prevented from leaking out from the opening for putting arranged on the cleaning box; and there is a gap between the surface for erasing and the inner wall, therefore, water can flow through the gap, so that the water can fully wraps the erasing surface of the board eraser and the cleaning effect is improved.

In an embodiment, step S103, that is flushing the board eraser(s) in the cleaning box(es) by the cleaning mechanism, and pressing the board eraser(s) by the pressing part(s) may include the following steps:

S103-1: flushing an erasing surface of the board eraser(s) in the cleaning box(es) by the cleaning mechanism in a second preset time; and S103-2: after the flushing, pressing a non-erasing surface of the board eraser(s) by the pressing part(s) to make the erasing surface be squeezed against an inner wall of the cleaning box(es) to make the water in the board eraser be squeezed out.

When the water in the board eraser is squeezed out, the dusts in the board eraser can flow away with the water. Performing the steps S103-1 and S103-2 above repeatedly, the board eraser can be cleaned sufficiently.

Generally, a board eraser 3 may include a handholding part 31 and an erasing part 32 as shown in FIG. 5. The erasing surface may be the surface of the erasing part 32, and the non-erasing surface may be the surface of the handholding part 31.

In an embodiment, steps S103-1 and S103-2 may be instead by the following step: flushing an erasing surface of the board eraser(s) in the cleaning box(es) by the cleaning mechanism, and simultaneously pressing a non-erasing surface of the board eraser(s) by the pressing part(s).

The way of flushing and pressing of this embodiment is differs from that of the previous embodiment. In the previous embodiment, flushing and pressing are performed sequentially; and in this embodiment, flushing and pressing are performed simultaneously. In this embodiment, the board eraser is sustainably flushed by the water during being pressed by the pressing part(s), which also can make the board eraser be cleaned sufficiently.

Figure 7:
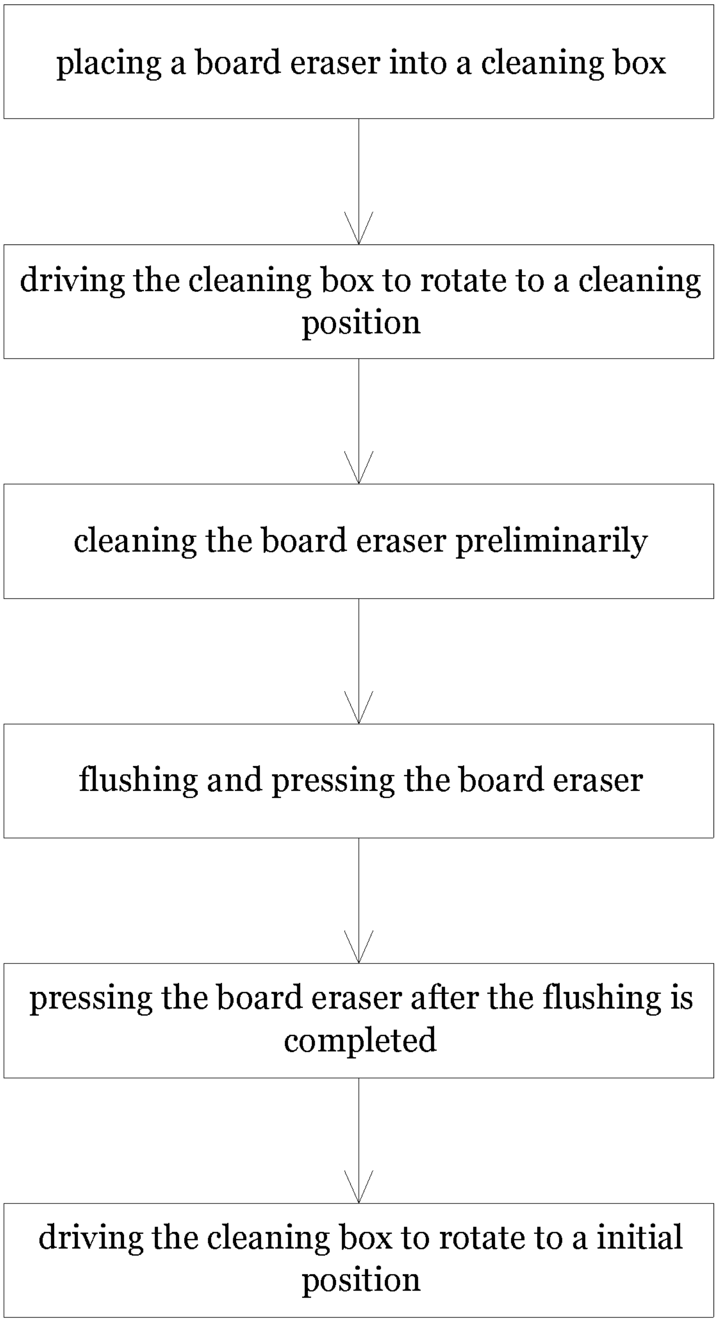
FIG. 7 is a flow diagram of a method for cleaning one or more board erasers according to embodiments of the present disclosure.

In an embodiment, as the fifth step shown in FIG. 7, after flushing the board eraser(s) is completed, several pressing the non-erasing surface of the board eraser(s) is performed by the pressing part(s) reciprocating. The water in the board eraser can be squeezed out sufficiently by the several pressing. In addition, the depth of the pressing can be controlled. A greater depth of pressing will make the board eraser drier than a small depth. That means the wetness of the erasing part 32 of a cleaned board eraser can be controlled by the depth of the pressing. A board eraser with suitable wetness performs better when used.

In an embodiment, flushing the erasing surface of the board eraser(s) by the cleaning mechanism includes: flushing the erasing surface of the board eraser(s) by the water output by the cleaning mechanism, where the water flows from up to down and wraps the erasing surface of the board eraser(s).

In this embodiment, a flushing way of water flowing from up to down is adopted, so that the self-weight of the water can be used to increase the flushing force of water, which can lead to a better performance of flushing. In this embodiment, the flushing force of the water comes from two sources, where the first source is the driving force of the cleaning mechanism, and the second source is the gravity of the water.

In an embodiment, pressing the non-erasing surface of the board eraser(s) by the pressing part(s) includes: pressing the non-erasing surface of the board eraser(s) in several times by the pressing part(s) reciprocating. The water in the board eraser can be squeezed out sufficiently by the several pressing, such that the dusts in the board eraser can be taken away sufficiently by the water.

In an embodiment, the cleaning method provided by the present disclosure further includes: recycling the wastewater generated by flushing the board eraser(s). The recycled wastewater can be filtered, and the filtered clean water can be fed into the cleaning mechanism again to realize the recycling of water and reduce the cleaning cost.

It should be understood that the sizes of the sequence number of the steps in the above embodiments do not mean the order of execution, and the order of execution of each step should be determined by its function and internal logic. The sizes of the sequence number of the steps do not constitute any limitation on the implementation process of the embodiment of the present disclosure.

The above descriptions are only preferred embodiments of the present disclosure, and are not intended to limit the present disclosure. Any modifications, equivalent replacements and improvements made within the spirit and principle of the present disclosure shall be included within the protection scope of the present disclosure.

The invention claimed is:

1. A device for cleaning one or more board erasers, comprising:

a case with an inner as an accommodating cavity, wherein a side wall or a top wall of the case is provided with one or more first openings that are in communication with the accommodating cavity;

one or more cleaning boxes configured for holding and cleaning the one or more board erasers, wherein the one or more cleaning boxes are arranged in the accommodating cavity, the one or more cleaning boxes correspond one-to-one to the one or more first openings, each cleaning box of the one or more cleaning boxes is provided with a second opening through which a first board eraser of the one or more board erasers is placeable into the each cleaning box, and two opposing side walls of the each cleaning box are provided with a water inlet and a water outlet, respectively;

a flushing mechanism comprising a piping and a first power member, wherein a first end of the piping is connected with the water inlet of the each cleaning box, a second end of the piping is connected with a water source, the first power member is arranged on a first inner wall of the case or a first outer wall of the case, and the first power member is connected to the piping and is configured to supply impetus to water in the piping;

one or more pressing parts arranged in the accommodating cavity and being slidable, wherein the one or more pressing parts correspond one-to-one to the one or more cleaning boxes, each pressing part of the one or more pressing parts is provided with a pressing surface facing towards a corresponding cleaning box, and the each pressing part is connected with a second power member to drive the each pressing part to slide; and a rotating mechanism arranged in the accommodating cavity, wherein the rotating mechanism is provided with a rotating driving end connected with a second outer wall of the each cleaning box, the rotating driving end is configured to drive the one or more cleaning boxes to rotate a preset angle, such that the one or more cleaning boxes are in an initial state or a working state; and wherein:

when a cleaning box of the one or more cleaning boxes is in the initial state, the second opening of the cleaning box faces towards and is aligned with a corresponding first opening of the one or more first openings, such that the first board eraser is placeable into the cleaning box through the corresponding first opening and the second opening of the cleaning box for cleaning;

when the cleaning box is in the working state, the second opening of the cleaning box faces towards and is aligned with a corresponding pressing part, such that the first board eraser is pressable by the corresponding pressing part; and wastewater generated as result of flushing the one or more board erasers by use of the flushing mechanism is held by the case and stored in the accommodating cavity.

2. The device of claim 1, wherein the piping is flexible, a sliding direction of the each pressing part is perpendicular to a normal direction of a first plate of the case, and the first plate is provided with the one or more first openings.

3. The device of claim 2, wherein the pressing surface of the each pressing part is a concave surface that matches an outer surface of the first board eraser.

4. The device of claim 2, wherein the rotating mechanism comprises:

a rotating shaft vertically arranged in the accommodating cavity, wherein the rotating shaft is rotatable and connected with the case;

one or more connection members, each of the one or more connection members is provided with a first connection end connected with the second outer wall of one of the one or more cleaning boxes and a second connection end connected with a third outer wall of the rotating shaft; and a third power member arranged on the first inner wall of the case or the first outer wall of the case, wherein the third power member is provided with a first driving end as the rotating driving end of the rotating mechanism, and the rotating driving end is connected with a first end of the rotating shaft.

5. The device of claim 2, wherein the second power member comprises an electric actuator arranged on the first inner wall of the case, and the electric actuator is provided with a second driving end connected with the each pressing part.

6. The device of claim 2, wherein:

a support fixedly is arranged under the second power member, the support is doorframe shaped and is in the accommodating cavity, and the support is configured for supporting the second power member;

a sleeve is arranged in the support, an axial direction of the sleeve is same as the sliding direction of the each pressing part, and a third opening of the sleeve is aligned with the each pressing part; and a guide rod passing through the sleeve is connected with the each pressing part, and the guide rod matches the sleeve and is slidable in the axial direction of the sleeve.

7. The device of claim 1, wherein the each cleaning box is provided with a positioning structure for positioning the first board eraser, and the positioning structure comprises one or more positioning rods, and wherein a first end of each positioning rod of the one or more positioning rods is connected with a bottom of the each cleaning box, a second end of the each positioning rod is configured to be inserted into a corresponding positioning hole arranged in the first board eraser to position the first board eraser, and a space for sliding is formed between the second end of a first positioning rod inserted into the corresponding positioning rod and a bottom of the corresponding positioning hole of the first board eraser.

8. The device of claim 7, wherein the corresponding positioning hole of the first board eraser is provided with:

a magnetic piece arranged in the corresponding positioning hole, wherein the first positioning rod is magnetic, and the second end of the first positioning rod is configured to be magnetically attachable to the magnetic piece; and an elastic member arranged in the corresponding positioning hole, wherein a first end of the elastic member is connected with the magnetic piece, and a second end of the elastic member is connected with the bottom of the corresponding positioning hole.

9. The device of claim 1, wherein a water tank is arranged under the case, an inner of the water tank is divided into a wastewater part and a clean-water part, a third end of the piping is connected with the clean-water part, a bottom of the case is provided with a water leaking opening in communication with the wastewater part, and a filtration structure is arranged between the wastewater part and the clean-water part.

10. The device of claim 9, wherein two slots opposite to each other are arranged on two inner walls of the water tank, respectively, the two slots are vertical, two sides of the filtration structure are inserted into the two slots, and the filtration structure is across the inner of the water tank.

* * * * *